United States Patent [19]

Vogel

[11] Patent Number: 4,798,771
[45] Date of Patent: * Jan. 17, 1989

[54] BEARINGS AND OTHER SUPPORT MEMBERS MADE OF INTERCALATED GRAPHITE

[75] Inventor: Ferdinand L. Vogel, Whitehouse Station, N.J.

[73] Assignee: Intercal Company, Port Huron, Mich.

[*] Notice: The portion of the term of this patent subsequent to Jan. 21, 2003 has been disclaimed.

[21] Appl. No.: 770,293

[22] Filed: Aug. 27, 1985

[51] Int. Cl.$^4$ .......................... B22F 7/04; C32B 15/16; C10M 103/02; C10M 125/02

[52] U.S. Cl. .................................... 428/564; 428/553; 252/29; 384/912

[58] Field of Search ............... 428/545, 551, 552, 553, 428/560, 561, 562, 563, 564, 565, 539.5, 408; 29/149.5 NM; 252/12, 12.2, 29, 30; 308/DIG. 8, DIG. 9; 384/907, 912; 501/90, 99; 523/468, 512; 524/424

[56] References Cited

U.S. PATENT DOCUMENTS

| | | | |
|---|---|---|---|
| 3,323,869 | 6/1967 | Olstowski | 23/209.1 |
| 3,409,563 | 11/1968 | Olstowski | 252/506 |
| 3,421,972 | 1/1969 | Cromwell et al. | 161/189 |
| 3,626,042 | 12/1971 | Appleby et al. | 264/29 |
| 3,859,421 | 1/1975 | Hucke | 423/445 |
| 3,925,495 | 12/1975 | Rodewald | 260/666 |
| 3,950,262 | 4/1976 | Lalancette | 252/187 R |
| 3,956,194 | 5/1976 | Armand | 252/507 |
| 3,984,352 | 10/1976 | Rodewald | 252/436 |
| 4,102,960 | 7/1978 | Borkowski | 264/42 |
| 4,119,655 | 10/1978 | Hulme | 260/440 |
| 4,128,499 | 12/1978 | Cohen | 252/378 R |
| 4,293,450 | 10/1981 | Vogel | 252/503 |
| 4,382,882 | 5/1983 | Vogel | 252/503 |
| 4,414,142 | 11/1983 | Vogel et al. | 252/506 |
| 4,461,719 | 7/1984 | Vogel | 252/503 |
| 4,565,649 | 1/1986 | Vogel | 252/503 |
| 4,642,201 | 2/1987 | Vogel | 252/503 |

FOREIGN PATENT DOCUMENTS 2024185 12/1971 Fed. Rep. of Germany .
2131500A 6/1984 United Kingdom .

OTHER PUBLICATIONS

Carbon (1976), 14, p. 175.
Vogel, "Mat. for Elec. Trans." JOM (1976) p. 25.
Foley, et al. "Room Temp. Elec. Cond. . . . ", Solid State Comm. 24 (1977) p. 371.
Vogel, "The Elec. Cond. of Graph. . . ." J of Mat. Sci. 12 (1977) p. 982.
Falardreau, "Very High Elec. Cond. . . ." J.C.S. Chem. Comm. (1977) p. 389.
Vogel, et al. "High Elec. Cond. . . ." Mat. Sci. & Engr, 31 (1977) p. 261.
Vogel, et al. "High Elec. Cond. . . ." New Devel. & Appln. in Composites (1978) p. 166.
Vogel, "Intercalation Corresponding Graphite" Molecular Metals (Plenum, 1977) p. 261.
Conte, "Graphite Inter. Comp . . ." ASLE Trans. 26(2), p. 200.
Perrachon, et al. "Elec. Cond. of Graphite. . . .".
Chemical Abstracts, vol. 99, No. 14, Oct. 3, 1983, p. 138, Abstract No. 107741p.

*Primary Examiner*—John F. Terapane
*Assistant Examiner*—Eric Jorgensen
*Attorney, Agent, or Firm*—Kenyon & Kenyon

[57] ABSTRACT

A bearing or other support member containing intercalated graphite exhibits many of the properties of a metal (ie: conductivity, luster, ductility) while enhancing the lubricating properties of pure graphite. The bearings are made by pressing an intercalated graphite powder either alone or mixed with metal powders, organic polymers or ceramic powders into the desired shape. This results in a bearing that has low friction properties, improved load bearing characteristics, higher operating temperatures and a reduced cost of manufacture.

17 Claims, No Drawings

BEARINGS AND OTHER SUPPORT MEMBERS MADE OF INTERCALATED GRAPHITE

This invention relates to contacts for the support of solid objects, such as bearings and other low friction support members, formed from intercalated graphite and a method of making same.

BACKGROUND OF THE INVENTION

The selection of materials used in bearings and other support members depends on an optimum matching of material properties with the requirements of low friction characteristics and high load-bearing capability.

Bearings are fabricated in a variety of ways, including casting, machining and powder metallurgy methods. Most bearings useful in heavy machinery are used in conjunction with a lubricant or general oil to reduce friction. These oil film-bearing materials include lead-tin alloys ("babitt metals"), copper-lead alloys, bronzes, aluminum, cast-iron, brass and steel, as well as commercial resins.

Another popular type of bearing material is boundary-lubricating (or "self-lubricating") bearing material. This type of material is useful under dry or sparsely lubricated conditions. Some of the more commonly used materials are oil-impregnated porous metals, wood, rubber and graphite by itself or mixed with resins, copper, babitt, silver or oil. These materials permit design simplification, low maintenance and freedom from oil contamination. They perform best at low speeds and intermittant operations.

Bearings of graphite, in particular, may be used with low viscosity liquids and in dry operations. Graphite's usefulness in dry operations stems from the ability of the graphite planes to slip past each other, which is due to the presence of water vapor or oxygen in graphite. Therefore, if conditions are such that the water or oxygen is driven off (i.e. elevated temperatures, high altitudes), the antifriction properties of the graphite bearings are impaired.

Bearings have been prepared from compression molded graphite-containing compacts filled with resins, copper, oil, etc., see Kirk-Othmer Encyclopedia of Chemical Technology, 3rd Ed., Vol. 3, pg. 683 (1978). These graphite bearings have found applications, for example, in machinery such as food or drug processors where contamination by oil and grease must be avoided and in chemical pumps which operate on low-viscosity, non-lubricating fluids. While graphite is a satisfactory, dry lubricant at room temperature in an ordinary atmosphere, at higher temperatures or altitudes, the water vapor leaves the system and the anti-friction properties are impaired. In addition, graphite compositions are characterized by brittleness and a low coefficient of expansion, which impart a tendency to crack when such compositions are struck on an edge or subject to high thermal, tensile, or bending stresses.

Thus, it has been necessary to confine application of bearings and other support members containing graphite within a given range of temperature and stress. It has also been required, in the fabrication of graphite bearings, to avoid sharp corners, thin sections and the like, and to relieve edges with a chamfer. It has further been the practice to surround graphite bearings with a steel sleeve to provide mechanical support and minimize changes in shaft clearance with temperature variations.

Therefore, a bearing having the low-friction properties of graphite but with improved strength and temperature resistance is desirable. In addition, the need often arises for a member that is not only self-lubricating but also electricly conductive. Examples of such members are small to medium machine gears and bearings used in printers, cash registers and the like.

Accordingly, it is desirable to develop a bearing or other members which has low-friction characteristics, which may conduct electricity as well, which is easy and economical to manufacture, and which is sufficiently strong to reduce the need for metal reinforcing.

It is therefore an object of this invention to provide an improved bearing or other support member made from graphite.

It is another object of this invention to provide a support member containing graphite which is stable in air and over a wide range of temperatures.

It is another object of this invention to provide a support member containing graphite which has superior low-friction characteristics.

It is a further object of this invention to achieve superior load-bearing capability due to higher strength and greater edge-holding properties.

It is another object of this invention to provide a contact that exhibits low friction properties and conducts electricity simultaneously.

It is still another object of this invention to provide a more efficient method of manufacture of a graphite containing support member which requires simplified dies for pressing.

Still another object of this invention is to provide a graphite support member requiring reduced amounts of metal reinforcement.

SUMMARY OF THE INVENTION

According to the invention, these and other objects are achieved by a support member containing intercalated graphite. The intercalating species may be any species which produces an intercalated graphite which is stable in air and at elevated temperatures such as a temperature up to 600° C. In general, the intercalating species may be but is not limited to metal halides of transition elements, of Group III A, IV A, V A and VI A metals or metalloids, as well as, the corresponding metals and metalloids themselves. In addition, halogens such as $F_2$ and $Br_2$ and interhalogens such as IBr may be useful as intercalating species as well.

The graphite to be intercalated may be any natural or synthetic graphite and may be employed in a powdered, fiber or in an exfoliated form.

The intercalated graphite is compressed uniaxially such as in a mold or die, or isostatically such as in a pressurized fluid to form a compact body of the desired shape. Alternatively, the intercalated graphite may be compressed into a blank and subsequently milled into desired shape.

Metal reinforcement may be included in the support member either as a layer or in a multi-layer structure, as a metal edge reinforcement, or as part of a composite material comprising intercalated graphite powder and metal powder.

In another embodiment, the intercalated graphite may be mixed with a thermoplastic or thermosetting polymer or other elastomer to achieve the desired properties.

DETAILED DESCRIPTION OF THE INVENTION

Intercalated graphite has several properties which are used advantageously in this invention. When graphite is intercalated, it exhibits certain metal-like properties of a metal, including increased conductivity, luster and ductility. While a compression molded body of graphite particles is extremely weak and friable, a body formed of intercalated graphite is found to have coherence and strength proportional to the magnitude of the applied body forming pressure and temperature. This characteristic of intercalated graphite powder enabling compaction to a solid body under pressure and temperature leads to the fabrication of a bearing having attractive engineering properties. Furthermore, intercalated graphite exhibits improved lubrication properties.

The intercalated graphites suitable for use in the invention are those which are stable in air and at elevated temperatures such as temperatures of 600° C. or higher. The most stable intercalated compounds are those intercalated with certain metal halides or metals, the main requirement being that the intercalating species is capable of exchanging charge with the host graphite crystal.

The metal halides most suitably used in the present invention are halides of transition elements, halides of group III A, IV A, V A and VI A metals or metalloids. The preferred Group III A elements include boron, aluminum, gallium and indium.

Graphites intercalated with the halides are formed in general by heating a mixture of graphite and the intercalating species to between 200° C. and 900° C. in the presence of chlorine gas for several hours. It is believed that the chlorine attacks the carbon atoms in the graphite lattice, thus forming positively charged sites throughout the graphite. The chlorine also reacts with the intercalating species to produce a negatively charged species which is attracted to and held by the positively charged carbon atoms thereby intercalating the graphite. This explanation of the mechanism of intercalation, however, is not meant to be definitive or a limitation of the invention.

The metal intercalated graphites may be produced by preparing a metal halide intercalated graphite by the process described above and then reducing the metal halide to a metal in situ in the presence of a reducing agent thus producing a graphite containing a metal in its lattice structure. Suitable reducing agents include hydrogen gas, lithium biphenyl and certain hydrides (e.g., $LiAlH_4$, $NaBH_4$, $NaH$, $CaH_2$). The reduction typically takes place at between 200° C. to about 300° C. It is believed that all the metal halides, described above, may be used to produce metal intercalated graphites that are equally as stable.

Of the above-described species, the metal halides are preferred and of these halides the copper chloride, nickel chloride and chromium chloride are most preferred. If, however, a metal intercalated graphite is desired the graphite preferrably contains copper, nickel or silver which has been reduced in situ from the corresponding halide.

The graphite employed in the present invention may be any of the known graphites and may be used in powder, fiber flaked or exfoliated form. In fact, it is believed that using exfoliated graphite facilitates the introduction of the intercalating species into the graphite lattice.

The support member of the present invention may be fabricated using a variety of parameters and constituents, depending on the ultimate use to which the member will be put. Where the body to be fabricated does not require metallic reinforcement, the intercalated graphite powder is placed in a mold of the desired shape and pressed. Pressures may range from low enough to barely produce a coherent mass, i.e. about 1000 pounds per square inch (psi), to as high as is practically possible. For example, a forming pressure of 15,000 psi produces a strong, useful member. The temperature applied during compression may range from ambient room temperature (about 20° C.) to about 1000° C. or higher, with room temperature being preferred. Higher temperatures and pressures produce higher strength and higher density bodies. Pressing times for these members range from 1 to about 30 minutes.

The materials used for the mold or die are important because intercalated graphite at elevated temperatures and pressures will adhere to most metals, such as steel, which are commonly used for this purpose. Therefore, it is desirable either to fabricate the die parts from solid polytetrafluoroethylene or similar non-stick materials, or to coat the metal of the die or mold with sprayed-on flouropolymite telomer powder. A suitable commercially available spray is GP 1589 available from Acheson Colloids Co., Port Huron, Mich. An aluminum foil or coatings of fine oxide powders, such as $Al_2O_3$, may also be helpful as parting materials.

The bearings of the present invention may also be fabricated through the use of isostatic pressing. The intercalated graphite material is placed in a bag-like container, the container is evacuated and is then submerged in a pressurized medium. Unlike typical mold or die presses which apply pressure in only one direction, isostatic pressure applies an essentially uniform pressure around the entire pressed object. In addition, isostatic pressing generates much higher pressures than the molds or dies and, therefore, produce support members exhibiting higher density and strength.

The bag-like container used in isostatic pressing is typically a shape-retaining rubber-like housing that will transfer pressure evenly around its perimeter. The housing will be shaped to conform with the desired final shape of the intercalated graphite bearing. The pressurized medium may be any suitable fluid such as ethylene glycol, hydraulic oil and the like.

Due to the large volume changes experienced when fabricating intercalated graphite members (especially when exfoliated graphite is one of the starting materials), some uniaxial pre-pressing of the intercalated graphite using conventional means is typically done before isostatic pressing is performed.

Where it is necessary or desirable because of the size of the bearing or because of the more strenuous requirements of the bearing application, metal reinforcement may be incorporated into the fabricated part. In one preferred embodiment, the metal is used as a laminate and takes the same general shape as a part of or as the entire bearing. The intercalated graphite is spread evenly in the mold or die as the first layer, then the metal reinforcement is put in place, followed by a top layer of intercalated graphite. This three layer structure is compressed for example at a pressures of from about 10,000 psi to 50,000 psi and a temperature of 200° C. These conditions are sufficient to produce a coherent body.

In another preferred embodiment, where the application requires that the bearing or other contact have a metal edge reinforcement, the mold may be shaped to receive and hold the metal reinforcement in position. After the metal reinforcement is in place in the mold, the intercalated graphite is introduced into the mold, and the whole is pressed and heated as set forth above to produce a coherent body.

In a third preferred embodiment, the desired properties may be obtained by pressing in a mold, as set forth above, a mixture of intercalated graphite and metal powders. In such applications, any metal powder may be used, such as copper, iron, or nickel, in proportions ranging from about 2 percent to about 90 percent by weight of the composite material. Preparation of a composite bearing or other contact of this type is possible because unlike non-intercalated graphite, intercalated graphite bonds to metals under pressure. Therefore, a mixture of intercalated graphite powder and metal powder will, under pressure, form a coherent mass in which the two constituents are mutually reinforcing.

Support members suitable for other applications may be obtained by mixing a thermoplastic or thermosetting polymer with intercalated graphite in proportions ranging from about 5 percent to about 85 percent by weight of the polymer in the resulting material. At the lower end of this range, hard, high strength, somewhat brittle composites are formed. At higher polymer concentrations, softer, more pliable composites are obtained. Preferred polymers for this use include epoxy resins, thermoplastic resins, aromatic resins, polyesters, aldehyde resins, aromatic resins, polyesters, polyamides, polyolefins of high and low molecular weight and varying degrees of cross-linking, polycarbonates, polyfluorinated olefins, polyurethanes, polyethers and the like.

When a thermosetting polymer is used, the intercalated graphite would typically be mixed with a thermosetting liquid resin, and formed into the desired shape. The mixture is then cured using techniques well-known to persons skilled in the art. When a thermoplastic polymer is employed, the polymer (which is typically a powder) is mixed with the intercalated graphite and the mixture is formed into the desired shape using temperature and pressure in much the same way as the intercalated graphite by itself would be formed into the desired shape.

In addition, a composite support member comprised of about 5 wt % to about 85 wt % of a ceramic powder and an intercalated graphite may be formed. The preferred ceramic powders include silicon nitride, boron carbide, silicon carbide, partially stabilized zirconia, titanium oxides and mixtures thereof.

A problem, which is sometimes encountered in members or structures formed from metal halide intercalated graphite, is that of environmental stability, particularly when the intercalated graphite members are stored or used under extremely high humidity. This stability problem takes the form of cracking, swelling and corrosion of the intercalated graphite member which appear after 1 to 6 months of storage or use. It is unclear as to what causes this lack of environmental stability, however, it does appear to be a function of intercalated graphite member forming pressures and temperatures (i.e., the higher the forming pressure or temperature, the more likely it is that this instability will appear) and possibly the type of graphite choosen as the starting material.

The present invention is not affected by this problem when low forming pressures and temperatures such as 10,000 psi and 20° C. are used, and when the use of the intercalated graphite members and structures are limited to normal humidity application. However, the lowering of the forming temperature and pressure leads to a comparable reduction in hardness and strength. The problem may also be solved by a composition prepared by mixing the intercalated graphite powder with small amounts of transition metals, such as nickel, copper, silver, molybdenum, or tungsten, prior to forming of an intercalated graphite member. Structural members of this composition, which may contain from about 2 vol. % to about 30 vol. % metal powder, experience none of the environmental stability problems described above even though a high forming pressure and temperature is used and high humidity is present. After the metal powder has been mixed with the intercalated graphite, this mixture may be handled in the same way as the intercalated graphite itself (see above).

From the foregoing, it is evident that the present invention provides novel bearings and other low friction support member capable of being formed economically into the desired shape in simple dies or molds and having improved strength.

The present invention is exemplified by the following examples, which are not intended to be limiting.

EXAMPLE 1

Graphite Intercalated with Copper Chloride

Graphite intercalated with copper chloride was prepared by mixing a quantity of graphite powder with a quantity of $CuCl_2$ to produce a mixture containing 48 wt % $CuCl_2$. This mixture was loaded into a guartz reaction vessel and heated to 125° C. for 1.5 hours with dry nitrogen flowing through the vessel to remove any water present therein. The temperature of the reaction vessel was then raised to 500° C., the dry nitrogen gas flow was stopped and a flow of dry chlorine gas at a gauge pressure of 3 to 6 inches of water was begun. The resulting reaction continued for 4 hours. This treatment produced a black powder having a bulk density of from 0.18 to 0.34 $gm/cm^3$ depending on particle size. The intercalated graphite particles are stage III and have a specific gravity of about 2.6 $gm/cm^3$.

EXAMPLE 2

A cylindrical bearing block one inch long with a diameter of one inch was made in a mold of appropriate shape as follows:

A 1" diameter round piece of thin aluminum foil was placed in the bottom of a cylindrical mold having a 1" diameter mold. A mixture of 2½ grams of copper chloride intercalated graphite produced according to the procedures of Example 1 plus 2 volume percent copper powder (Natural Copper Powder Extra Fine, #1400 U from Atlantic Powder Metals, Inc. of New York, N.Y.) was then carefully poured into the mold. A second 1" diameter piece of aluminum foil was placed over the mixture and a piston was slowly inserted into the mold. The temperature of the mold was increased to 180° C. and a pressure of 32,000 psi was applied to the mixture by the piston for 3 minutes. After cooling and extracting the piece from the mold, the aluminum parting foils were removed and a scleroscope hardness of 54 was measured. This represents a high degree of hardness and is equivalent to strength approaching 200,000 psi. The blank described was then converted to a bearing by drilling a hole in the center of the bearing sufficiently sized to accomodate a shaft along the bearing's longitudinal axis.

EXAMPLE 3

A teflon mold may be shaped to receive and hold in position a reinforcement of copper metal. After the copper reinforcement having a thickness 0.020" is inserted, a mixture of intercalated graphite and 5 wt percent copper may be introduced in sufficient amount into the cavity and the whole may be pressed at 50,000 psi and 100° C. for 30 minutes to produce a coherent body.

EXAMPLE 4

A mixture of intercalated graphite made according to the procedures of Example 1, and 2 weight percent copper powder (Natural Copper Powder Extra Fine #1400 U from Atlantic Powder Metals, Inc., of New York, N.Y.) was pressed at room temperature in a 0.33" I.D. cylindrical metal mold to 50% of ideal density (maximum theoretical density to which the mixture would be compressed). This compact was then inserted into a neoprene rubber bag having an I.D. of 0.33" and a sealed end. The air was evacuated from the open end and sealed. The bag and its contents were enclosed in the pressure cell of an isostatic pressing apparatus; heated to 100° C. and isostatically pressed for 30 minutes at 100,000 psi. The result was a dense compact having a scleroscope hardness of 35 and suitable for machining into bearing or bushing parts.

EXAMPLE 5

52.8 gms of intercalated graphite produced as outlined in Example 1 was thoroughly mixed with 79.0 gms of polyethylene, a thermoplastic. The mixture was then formed into the desired shape in a teflon coated die at a pressure of 12,000 psi and a temperature of 90° C. for 10 minutes. The resulting compact had an electrical resistivity of 0.1 Ω cm tribological characteristic making it suitable for a self lubricating, electrically conductive machine part.

EXAMPLE 6

160 gms of intercalated graphite produced as outlined in Example 1 may be thoroughly mixed with 40 gms of Araldite 488N40, a thermosetting Epoxy made by Ciba-Geigy. The mixture is then formed into the desired shape and is cured using techniques well-known to persons skilled in the art.

EXAMPLE 7

A bearing blank of an intercalted graphite/epoxy composite was made as follows:

Seven (7.0) grams of epoxy resin (Araldite 6010 made by Ciba Geigy) and 31 grams of copper chloride intercalated 24 chopped fibers (EP #C1, 001 made by Intercal of Port Huron, Mich.) was thoroughly blended in a laboratory size Z blade micromixer. This mixture was removed and placed in a polyethylene beaker and 1.4 grams of hardener (HY 9437 manufactured by Ciba Geigy) was thoroughly stirred in. The finished mixture was then transferred to a cylindrical polyethylene mold consisting of a 1" ID, 2" OD, 3 ½" long cylinder with a ¼" end plug. A 1" diameter plunger was inserted and light pressure (1000 psi) applied. The mold and contents were held at room temperature (20°-23° C.) for 24 hours and the molded blank removed. The finished bearing was made from the blank by drilling a hole of appropriate size to accommodate a shaft along the bearing's longitudinal axis.

What is claimed is:

1. A bearing member consisting essentially of a shaped, compacted, load bearing, low friction body formed from an intercalated graphite which is stable in air and at an elevated temperature, and is produced by an intercalation reaction of graphite and an intercalating species, said intercalating species producing the stability in air and at elevated temperature of the intercalated graphite, said reaction causing the presence of oxidized carbon in the graphite and the presence of negatively charged molecules within the intercalating species.

2. A bearing member in accordance with claim 1 wherein the intercalated graphite is intercalated with an intercalation species selected from the group consisting of a metal halide and a metal wherein the metal halide is selected from the group consisting of a halide of a transition element, a halide of a Group III A, IV A, V A and VI A metal or metalloid, and the metal is selected from the group consisting of a transition element, a Group III A, IV A, V A, and VI A metal or metalloid.

3. A bearing member in accordance with claim 2 wherein the intercalation species is the metal halide.

4. A bearing member in accordance with claim 3 wherein the metal halide, prior to forming said member, is reduced in situ to a metal in the presence of a reducing agent thus forming a metal intercalated graphite.

5. A bearing member in accordance with claim 1 further comprising a metal reinforcement incorporated into the member.

6. A bearing member in accordance with claim 5 wherein the metal reinforcement is interposed between layers of the intercalated graphite.

7. A bearing member in accordance with claim 5 wherein the metal reinforcement is disposed on an edge of said support member.

8. A bearing member in accordance with claim 1 further comprising a metal powder admixed with the intercalated graphite.

9. A bearing member in accordance with claim 8 wherein the metal powder is selected from the group comprised of copper, iron, nickel, and cobalt.

10. A bearing member in accordance with claim 8 wherein the metal powder comprises from about 2 percent to about 90 percent by weight of said support member.

11. A bearing member in accordance with claim 1 further comprising a thermoplastic polymer admixed with the intercalated graphite.

12. A bearing member in accordance with claim 11 wherein the thermoplastic polymer comprises from about 5 percent to about 85 percent by weight of the support member.

13. A bearing member in accordance with claim 1 further comprising a thermosetting polymer admixed with said intercalated graphite.

14. A bearing member in accordance with claim 13 wherein the thermosetting polymer comprises from about 5 percent to about 85 percent by weight of the support member.

15. A bearing member in accordance with claim 1 further comprising a ceramic powder admixed with said intercalated graphite.

16. A bearing member in accordance with claim 15 wherein the ceramic powder comprises from about 5 percent to about 85 percent by weight of the support member and wherein the ceramic powder is selected from the group comprised of silicon nitride, boron carbide, silicon carbide, partially stabilized zirconia, titanium oxides and mixtures thereof.

17. A bearing member consisting essentially of a shaped, compacted, load bearing, low friction body which is stable in air and at elevated temperature and is produced by an intercalation reaction of graphite and copper chloride, nickel chloride or chromium chloride.

* * * * *